United States Patent [19]

Julien et al.

[11] Patent Number: 5,005,678
[45] Date of Patent: Apr. 9, 1991

[54] METHOD AND APPARATUS FOR SENSING AND DAMPING VIBRATION

[75] Inventors: Gerald J. Julien, Puyallup; Steven P. Robinson, Seattle, both of Wash.

[73] Assignee: The Boeing Company, Seattle, Wash.

[21] Appl. No.: 318,393

[22] Filed: Mar. 3, 1989

[51] Int. Cl.[5] .............................................. F16F 7/10
[52] U.S. Cl. ..................... 188/378; 181/208
[58] Field of Search ................. 188/378, 379, 380; 181/208

[56] References Cited

U.S. PATENT DOCUMENTS

| | | | |
|---|---|---|---|
| 4,023,651 | 5/1977 | Healiss | 188/378 X |
| 4,030,756 | 6/1977 | Eden | 188/378 X |
| 4,365,770 | 12/1982 | Mard et al. | 188/378 X |
| 4,436,188 | 3/1984 | Jones | 188/378 |
| 4,470,121 | 9/1984 | Ebert | 188/378 X |
| 4,483,425 | 11/1984 | Newman | 188/378 |
| 4,601,362 | 7/1986 | Wren | 181/208 |
| 4,724,923 | 2/1988 | Waterman | 181/208 |
| 4,795,123 | 1/1989 | Forward et al. | 188/378 X |

OTHER PUBLICATIONS

"Advanced Composites with Embedded Sensors and Actuators", Technical Proposal D180-30943-1, Boeing Aerospace Company, Seattle, Wash., 98124.

Primary Examiner—Douglas C. Butler
Attorney, Agent, or Firm—Christensen, O'Connor, Johnson & Kindness

[57] ABSTRACT

A shape memory alloy used for both sensing and damping vibration of a structure. In one embodiment, a flat bar (12) is mounted from one end on its edge so that its other end vibrates from side-to-side at its natural resonant frequency. A vibration damping wire (30) extending longitudinally along one surface of the bar is mounted under tension between spaced apart standoffs (32); a sense wire (42) is similarly mounted along the opposite surface of the bar. The vibration damping wire and sense wire comprise a nickel-titanium (Nitinol) alloy, having a relatively high specific damping coefficient. Absorption of kinetic energy by the vibration damping wire when it is stretched by deflection of the bar greatly reduces the time required to passively damp vibration of the bar, compared to its undamped resonant time. the vibration damping wire is heated above a transition temperature by an electrical current pulse while relaxed to restore it to its unstretched length. The sense wire changes resistance in proportion to stress applied to the wire so that a voltage drop across the sense wire corresponds to the vibrational displacement of the bar. The voltage drop signal is used to control application of the current pulse in synchronization with the vibratory motion of the bar. To actively damp vibration of the bar, the pulse of electrical current is applied to heat the Nitinol alloy above its transition temperature so that it resumes a foreshortened memory shape as the bar's vibratory deflection tries to stretch the vibration damping wire. The vibration damping wire thus applies a force to the bar in opposition to its vibration. Other embodiments include a cylinder (52) and a vibration damped strut assembly (80). In these latter two embodiments, vibration damping wires and sense wires are disposed internally within the structure. A digital control (110) or analog vibration damping control (200) controls the application of current pulses to heat a selected vibration damping wire above the transition temperature in phase with the signal produced by the sensor wire.

41 Claims, 7 Drawing Sheets

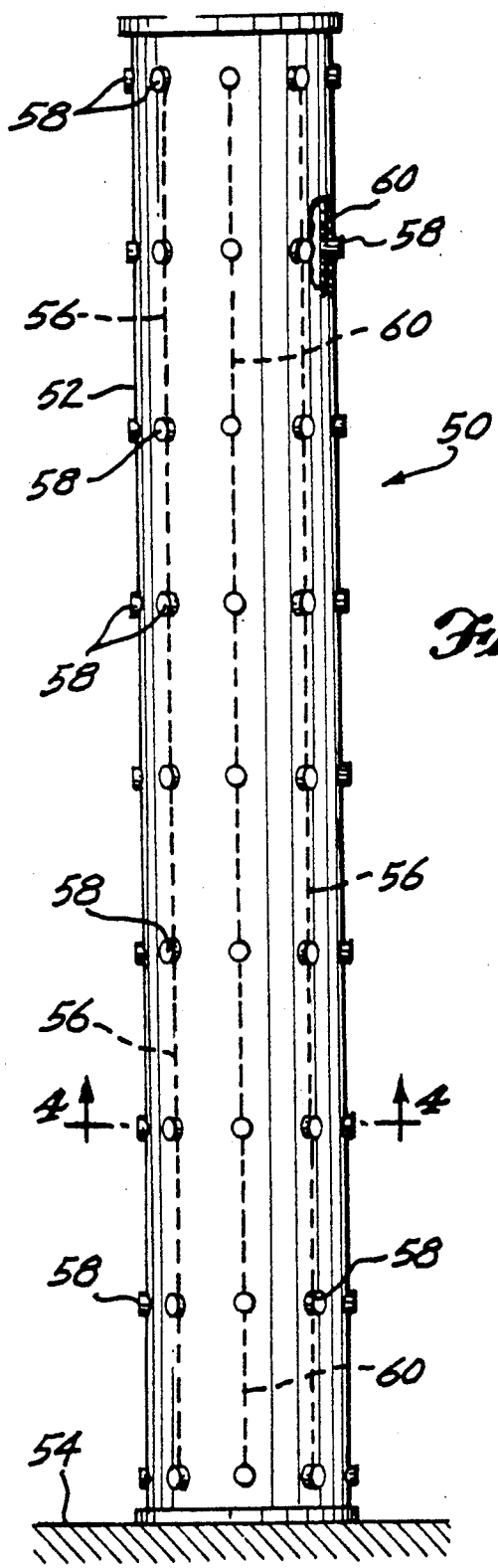
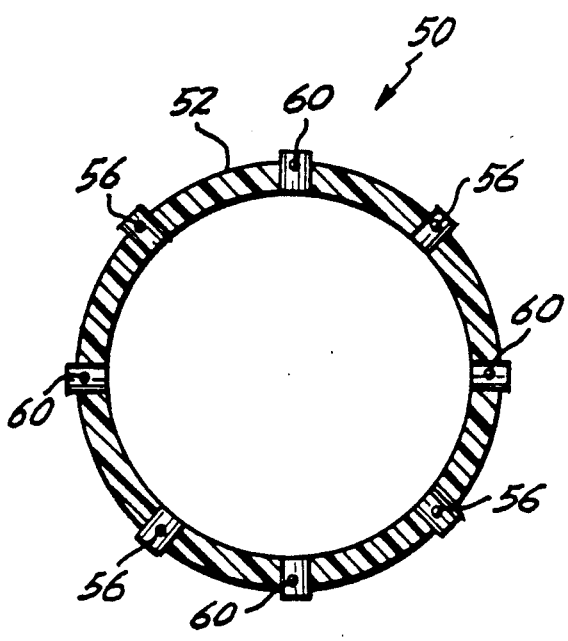

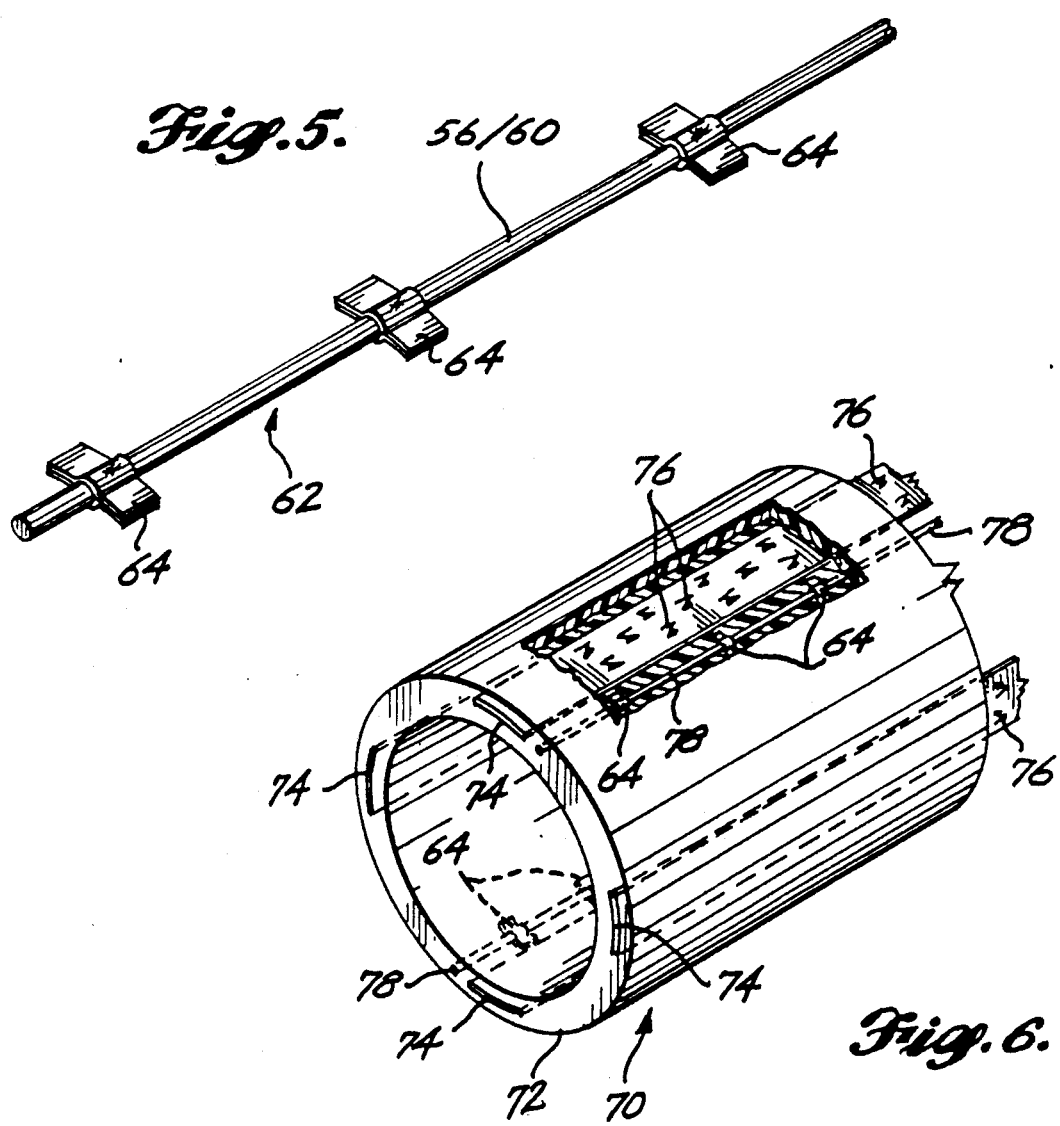

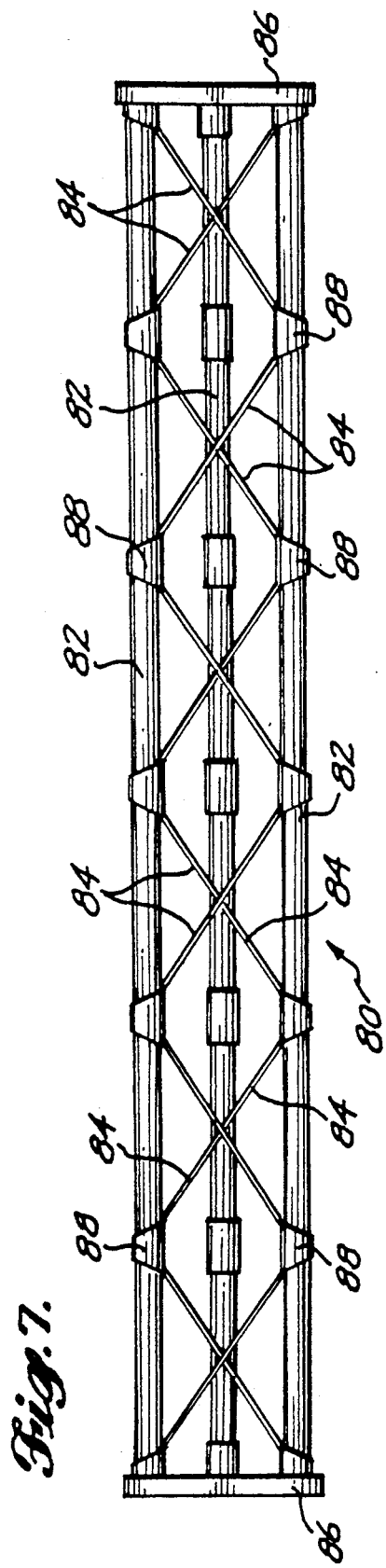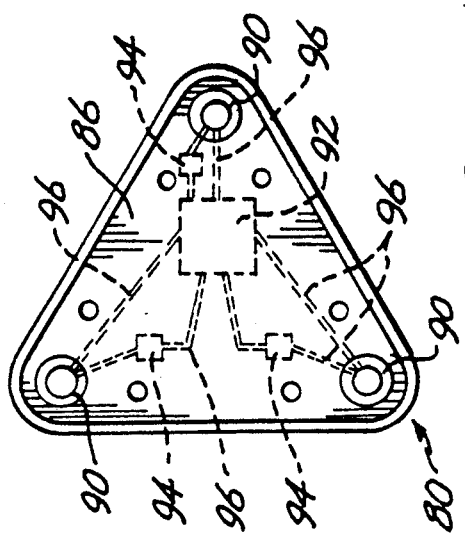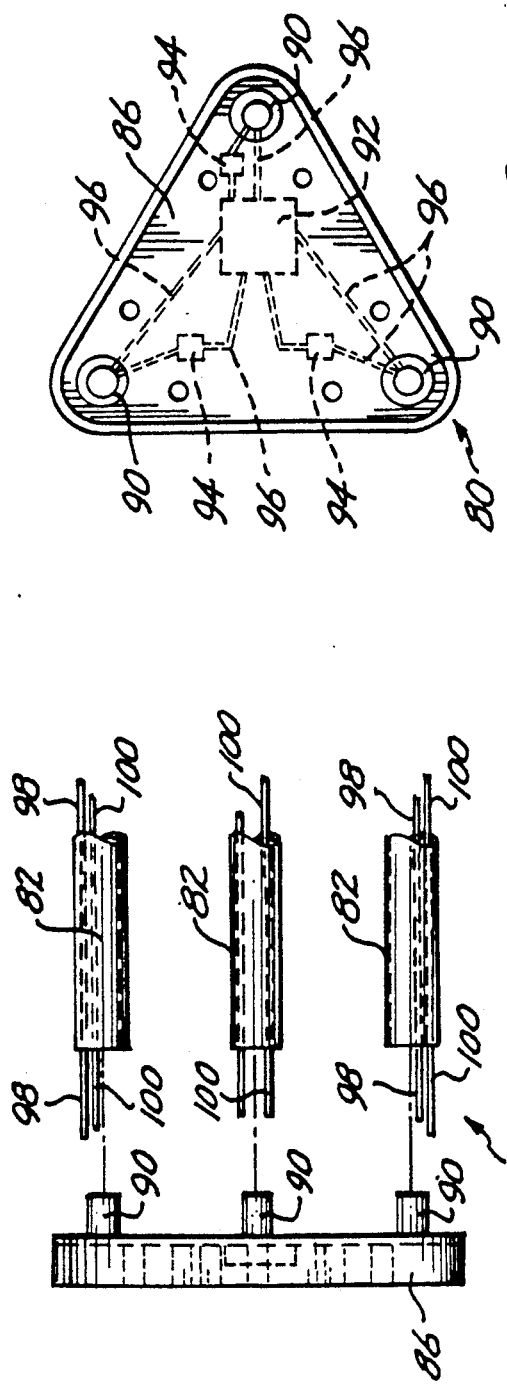

METHOD AND APPARATUS FOR SENSING AND DAMPING VIBRATION

TECHNICAL FIELD

This invention generally pertains to a method and apparatus for damping structural vibration, and more specifically, to sensing the deflection of a structure as it vibrates and applying a force opposing the deflection to damp the vibration.

BACKGROUND OF THE INVENTION

Every physical structure has a resonant frequency at which it vibrates when excited by a driving force. If the energy of the driving force is sufficiently great, sustained vibration of a structure at its resonant frequency may damage or destroy it. Even vibration at a relatively low amplitude may be undesirable in certain sensitive or critical components. For example, excitation of resonant vibration in the frame of a satellite optical system occurring each time that the device is moved and aimed at a different target may result in an unacceptably long time delay before the satellite optical system is again usable. In such components, it is important to quickly damp the vibration.

Conventional techniques to reduce the effect of vibration on a structure have used resilient materials, such as rubber, to isolate the structure from vibrations that would otherwise be induced through an attached support or mount. When applied along the surface of a component, elastic materials can also absorb energy directly from the component to reduce the duration of its vibration; however, in many applications, it is not practical to coat the surface of a structure with an elastic material or to use a resilient mount or suspension to connect the structure to a supporting body.

A passive method of vibration damping to control noise emissions is described in an article entitled, "The Quiet Alloys," published in *Machine Design Magazine*, Apr. 1978, pp. 202-206. This article suggests manufacturing components subject to vibration from metal alloys having a characteristic high specific damping capacity (SDC). Copper-manganese alloys (Incramute), nickel-titanium alloys (Nitinol), and other alloys of copper and nickel are proposed for such use, to damp vibration and reduce noise emanating from a component. The article also teaches that vibration can be reduced in a steel component by replacing about ten percent of its volume with plugs or rings comprising a high SDC metal alloy.

Active vibration damping has also been employed to reduce the amplitude of structural vibration, often much more rapidly than possible with passive, energy absorbing vibration damping materials. For example, in U.S. Pat. No. 4,724,923, an electromagnet is used to oppose the vibrational motion of a body, quickly restoring the body to its rest position. A control energizes the electromagnet in phase with the resonant frequency of the body so that a magnetic force is applied to restore the body to its rest position during each cycle of its vibratory motion, quickly damping the vibration. In many applications, it would be virtually impossible to mount an electromagnet adjacent a structure to damp its vibration. In addition, structures comprising only nonmagnetic materials would not be affected by the electromagnetic force.

Hydraulic or pneumatic actuators are also sometimes used in conventional active damping systems to provide a synchronous restoring force to damp structural vibration. However, the weight and size constraints of such devices significantly limit their usefulness.

Whether electromagnetic, hydraulic, or pneumatic, a damping actuator in an active vibration damping system should be controlled in response to the vibrational displacement of the effected structural component, so that the actuator provides a restoring force to oppose or resist vibrational motion, rather than driving the vibration to even greater amplitude. Accelerometers, strain gauges, LVDTs, and other types of conventional displacement, velocity, or acceleration sensors may be employed to provide a signal for controlling the application of a restoring force by an actuator used to damp the vibration of a structure. However, in structures subject to multimode vibration, e.g., vibration at multiple harmonics of the resonant frequency, a single such sensor is likely to be inadequate. Instead, a plurality of sensors (and a corresponding plurality of actuators to provide the restoring force) should be disposed at a number of spaced apart positions within the structure to sense and damp each node of its multimode vibration. Unfortunately, for many applications, use of conventional displacement/motion vibration sensors and conventional hydraulic or pneumatic damping actuators to control multimode vibration would probably be prohibitively expensive and complex.

There are other practical limitations to conventional active vibration damping systems. Attachment of vibration sensors and conventional active damping actuators to a structural component may interfere with its function. For example, the aerodynamic properties of a helicopter rotor blade would likely be adversely affected by externally mounted hydraulic or pneumatic dampers. Mounting conventional active damping actuators internally within a structure could significantly weaken it due to the size of such devices. In fact, virtually none of the prior art active vibration damping systems are sufficiently compact to be integrated within most structural components.

SUMMARY OF THE INVENTION

In accordance with the present invention, a mechanism is provided for damping vibration of a structure. The mechanism includes a member comprising a metal alloy having temperature responsive shape memory characteristics and characterized by very high specific damping capacity, compared to that of the structure. Means are included for attaching the member to the structure at two or more spaced apart points that are offset from a neutral axis of the structure. The spaced apart points are selected so that the distance between the points cyclically varies as the structure vibrates. Variation in the distance between the points at which the member is attached stresses the member as the structure vibrates; the stressed member absorbs energy, damping the vibration of the structure.

In one preferred form, the member is externally attached to the outer surface of the structure.

In another preferred form, the member is integral to the structure, being disposed within it. In implementing this latter form, the structure may comprise a composite material in which the member is embedded. The means for attaching the member to this structure preferably comprise a plurality of stabilizers spaced apart along a longitudinal axis of the member. The stabilizers have a different cross-sectional size than the member and are fixedly held in place by their embedment within the composite material.

In one form of the mechanism, the member dampens vibration as the structure is displaced in a direction generally transverse to its neutral axis. Accordingly, the member is elongate and extends generally parallel to a longitudinal axis of the structure. In yet another form of the mechanism, the member dampens torsional vibration about the neutral axis.

The mechanism also may include means for heating the member above a transition temperature at which it resumes a foreshortened memory shape. Control means connected to the means for heating enable heating of the member above the transition temperature in response to the vibration of the structure, so that it applies a force damping the vibration.

In addition, the mechanism comprises means for sensing vibration of the structure, producing a signal indicative of the vibration. The control means are connected to receive the signal and are operative to enable the means for heating in synchronization with the vibration of the structure. The means for sensing preferably comprise a metal alloy material having temperature responsive shape memory characteristics and are characterized by a change in electrical resistance as a function of applied stress. The means for sensing are attached to the structure at least at two spaced apart points and are stressed as the structure vibrates. The signal indicative of vibration comprises a measure of the electrical resistance of the metal alloy material that changes in response to the stress.

Another aspect of this invention relates to a method for damping vibration of a structure, including steps generally consistent with the functions of the elements described for the above mechanism.

Still another aspect of the invention is directed to a vibration sensor including a member comprising a metal alloy having temperature responsive shape memory characteristics. The member is characterized by an electrical resistance that varies as a function of stress to which the member is subjected when connected to a vibrating structure at a plurality of spaced apart points. Means are provided for monitoring the electrical resistance of the member and producing a corresponding signal that is indicative of a vibration induced stress of the member. The means for monitoring resistance comprise a resistance sensor and may include a source of voltage and means for measuring a voltage drop across the member. Preferably, the member comprises an alloy of nickel and titanium. In one form of the vibration sensor, the member comprises an elongate wire; in another form, the member comprises a thin foil strip.

BRIEF DESCRIPTION OF THE DRAWINGS

FIG. 3 is a side elevational view illustrating a vibration damped cylinder;

FIG. 4 is a cross-sectional view of the vibration damped cylinder of FIG. 3, taken along section lines 4—4;

FIG. 5 is an isometric view of a vibration damping-/sense wire and restraints;

FIG. 6 is an isometric view of a second embodiment of a vibration damped cylinder, partially cut away to show a vibration damping strip and a sense wire embedded therein;

FIG. 7 is an elevational view of a vibration damped strut assembly;

FIG. 8 is an exploded view of a base portion of the vibration damped strut assembly of FIG. 7;

FIG. 9 is an end view of the vibration damped strut assembly base plate;

DESCRIPTION OF THE PREFERRED EMBODIMENTS

Figure 1:
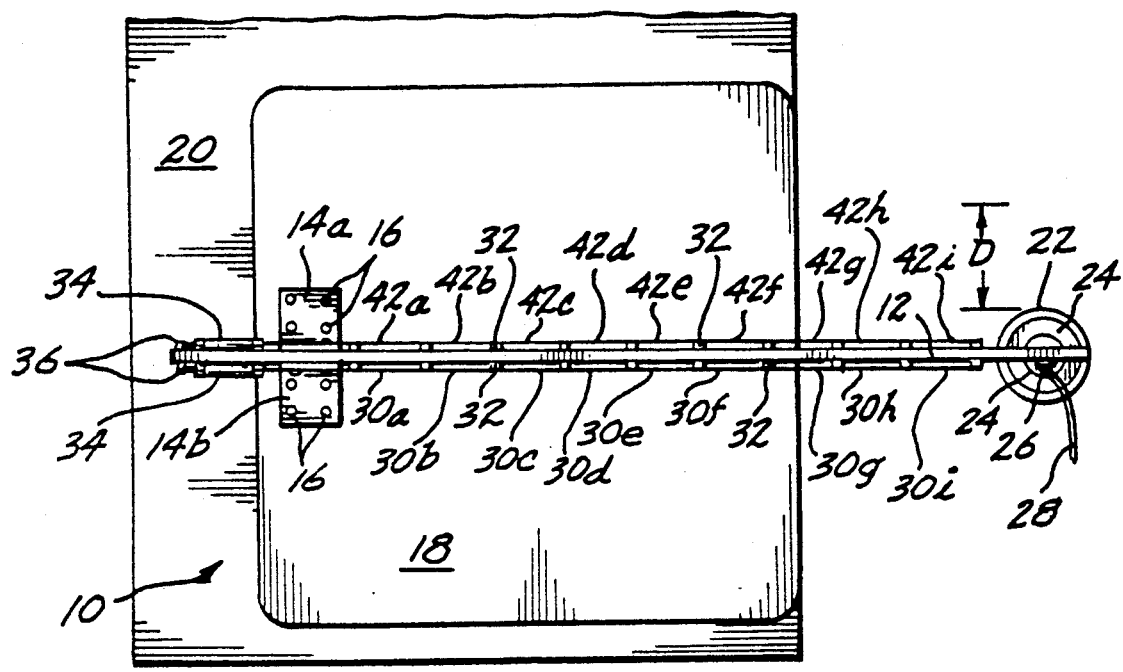
FIG. 1 is a plan view of a first embodiment of a vibration damped structure in accordance with the present invention.
Figure 2:
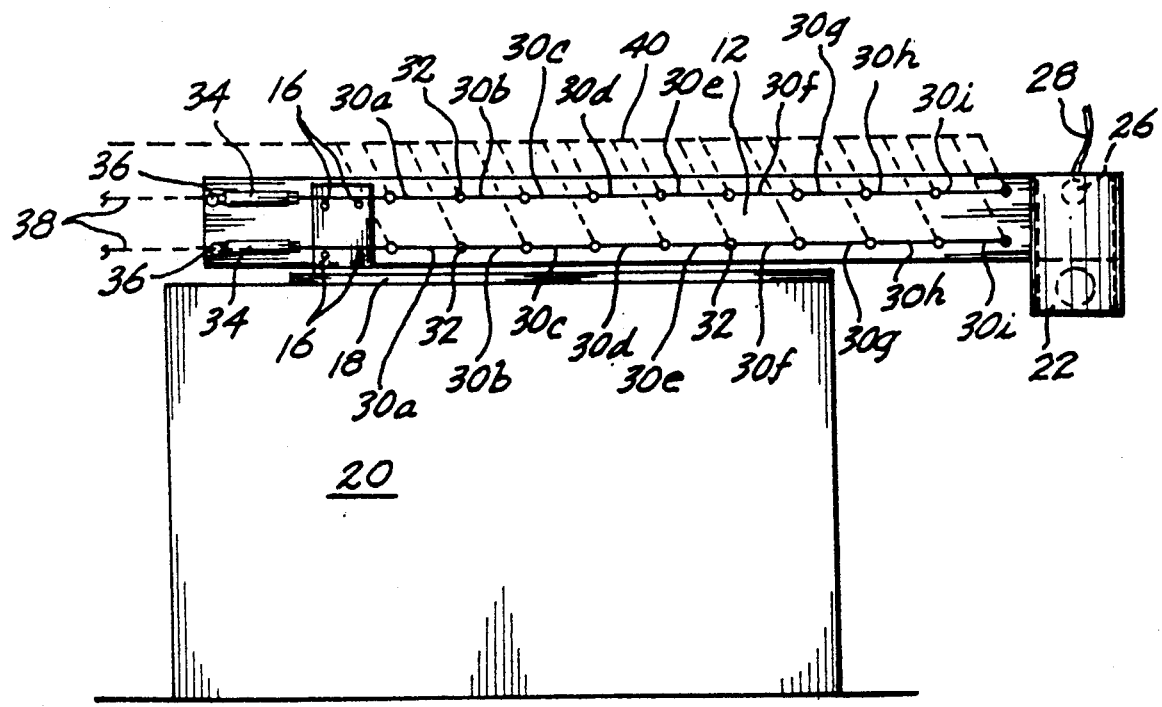
FIG. 2 shows an elevational view of the vibration damped structure of FIG. 1.

Referring to FIGS. 1 and 2, a first embodiment of a vibration damped structure built to test the operability of the present invention is shown generally at reference numeral 10. Vibration damped structure 10 includes a flat aluminum bar 12, approximately 6 inches wide and ⅛" thick, which is mounted on its edge to a board 18, between two L-shaped brackets 14a and 14b, using bolts 16. The flat sides of bar 12 are vertically aligned, with the lower edge spaced approximately ½" above the top surface of board 18. As shown in FIG. 1, board 18 rests on a bench 20, and the free distal end of bar 12 extends about 4 feet beyond brackets 14, overhanging the edge of both the board and the bench. A slotted tube 22 is attached to the distal end of bar 12, and semi-circular lead weights 24 are fitted inside slotted tube 22, adjacent the flat sides of bar 12. Lead weights 24 and slotted tube 22 add approximately 4.5 lbs. of weight and are provided to increase the free damping time of the distal end of bar 12 as it vibrates back and forth.

Before a vibration damping assembly was attached to bar 12, a test was made to determine the natural or "undamped" resonant time of the bar for a given deflection. To introduce vibration into bar 12, its distal end was physically displaced several inches to one side, elastically bending bar 12 with respect to its attachment to board 18 at brackets 14. When released, the distal end of bar 12 accelerated toward its normal rest position, shown in FIG. 1, continuing on toward the opposite side from which it was originally displaced, and then swung back toward the position of its original displacement. It continued swinging back and forth at its resonant frequency, with gradually decreasing amplitude, until finally coming to rest as its internal friction and the friction of its motion through air damped the vibration.

An accelerometer 26, which was mounted between one of the weights 24 and the flat side of bar 12, produced a signal indicative of the acceleration of the distal end of bar 12 as it vibrated back and forth. The signal produced by accelerometer 26 was conveyed through a cable 28 and processed so that the vibrational motion of bar 12 and resonant time could be observed on an oscilloscope (not shown) and recorded. For an initial deflection, D, the time required for the vibrations induced in bar 12 to damp out, i.e., the time for the bar to come to rest, was approximately seven minutes.

A vibration damping assembly in accordance with the present invention was then installed on bar 12. In this first embodiment, the vibration damping assembly included one 0.010" diameter vibration damping wire 30 and a 0.010" diameter sense wire 42, each comprising a nickel-titanium SME (Nitinol) alloy. The vibration damping wire 30 was attached on one flat side of bar 12, adjacent its top edge, at a plurality of spaced apart points using standoffs 32. (NOTE: In FIGS. 1 and 2, an alternative embodiment of the vibration damping assembly is shown in which two vibration damping wires 30 are attached to bar 12, the second one being disposed adjacent the lower edge of the bar. The second vibration damping wire was not installed during the passive and active vibration damping tests described below, but is included in the figure to better illustrate the alternate preferred embodiment.) Standoffs 32 comprised dielectrically mounted metal posts that were bolted to bar 12, but were electrically insulated from the bar. The outwardly extending ends of standoffs 32 were mechanically clamped to vibration damping wire 30, so that the vibration damping wire was mounted approximately 5/16" apart from a central longitudinal plane of the bar.

During the installation procedure, vibration damping wire 30 was initially attached only to the standoff 32 disposed adjacent slotted tube 22; the other end of the vibration damping wire was connected to turnbuckle 34. Turnbuckle 34 was attached by a bolt 36 to the proximal end of bar 12, i.e., the end disposed adjacent brackets 14. Turnbuckle 34 was tightened to make the vibration damping wire taut, and each of the remaining standoffs 32 were then clamped to vibration damping wire 30 while the wire was under tension. A single sense wire 42 was mounted under tension adjacent the opposite flat side of bar 12, in a similar fashion, using another turnbuckle 34 and other standoffs 32. A wire harness 40 comprising a plurality of leads (shown in phantom view) was electrically connected to vibration damping wire 30 and sense wire 42 at each standoff 32, and a common lead 38 was connected to bolt 36 by a lead 38.

Initially, the vibration damping assembly was tested in a passive mode, relying solely upon the high specific damping capacity (SDC) of the nickel-titanium alloy comprising vibration damping wire 30 and sense wire 42 to absorb vibrational energy from bar 12. The SDC of the Nitinol alloy is approximately 40%—relatively high compared to the SDC of other metals and alloys. In contrast, the SDC of aluminum from which bar 12 is comprised is less than 0.5%.

After vibration damping wire 30 and sense wire 42 were attached to bar 12, it was again manually deflected by a displacement, D, and released. As bar 12 vibrated from side to side, it alternately stretched the vibration damping wire 30 and elastically stressed sense wire 42 between each adjacent pair of standoffs 32. Each time that bar 12 deflected toward the side on which vibration damping wire 30 was attached, relaxing the tension on the vibration damping wire, an electrical current pulse was applied to heat the vibration damping wire above its transition temperature, converting the Nitinol alloy to its Austenite phase. When thus heated, it shrank to a foreshortened length. The Nitinol alloy comprising vibration damping wire 30 then cooled, converting back to the Martensite phase, permitting the vibration damping wire to resume its nominal unstretched length. As the bar deflected back in the opposite direction, it again stretched vibration damping wire 30. The electrical current pulse was required to heat vibration damping wire 30 above the transition temperature each vibrational cycle to restore the vibration damping wire to its unstretched Martensitic length, but would not have been necessary if the vibration damping wire had not been stressed beyond its elastic limit by displacement of bar 12. Timing of the electrical pulse was controlled in response to a signal produced by sense wire 42, as explained below. The plastic deformation of the Nitinol alloy that occurred when vibration damping wire 30 was stretched absorbed kinetic energy from the bar, converting it to strain energy. Using only the passive mode of damping, the vibrations of the bar were damped out within about 4 minutes, 10 seconds. Thus, the relatively high SDC of the Nitinol alloy used for vibration damping wire 30 (and sense wire 42) reduced the damping time of bar 12 by about 2 minutes, 50 seconds, compared to the natural resonant time.

A much more significant reduction in damping time was achieved using the damping assembly in an active mode. To actively damp vibration of bar 12, vibration damping wire 30 was again repetitively heated above the transition temperature of the Nitinol alloy using an electrical current pulse applied to the vibration damping wire in synchronization with the stretching of the vibration damping wire that occurred during each cycle of vibrational movement of bar 12. However, to effect the active mode of damping, the current pulse was applied at a different point in time during each vibration cycle than in the passive damping mode, as explained below. Vibration damping wire 30 cooled below the transition temperature between each electrical current pulse as bar 12 deflected toward the side on which the vibration damping wire was attached. In a test of the active damping mode, the damping time was only 28 seconds for the same initial displacement, D, of bar 12 as used in the earlier two tests.

The remarkable active damping capability of vibration damping wire 30 is a consequence of the shape memory characteristics of the Nitinol alloy of which it is comprised. Just as in the passive vibration damping mode, the side-to-side vibration of bar 12 alternately stretches, then relaxes the portions of vibration damping wire 30 held under tension between adjacent standoffs 32, cyclically stressing the wire in phase with the periodic deflection of the bar. The vibration damping wire actively damps vibration of bar 12 by opposing the bar's deflection when the crystalline structure of the Nitinol alloy shifts into the shorter Austenite memory shape phase as the alloy is heated beyond its transition temperature by application of the electrical current pulse. In the active damping mode, the electrical current pulse is applied as bar 12 deflects toward the side on which vibration damping wire 30 is attached, just as the stress on the vibration wire is approaching a minimum (about 90° later in phase than in the passive damping mode), and rapidly heats vibration damping wires 30 above the transition temperature, converting the Nitinol to the Austenite phase.

When the Nitinol alloy converts to its Austenite phase, it resumes a foreshortened memory shape, applying force against any constraint that would prevent it from shrinking to its memory shape length. In the transition to Austenite phase from Martensite, the yield stress and modulus of elasticity of the Nitinol alloy increase from about 20 KSI to about 60 KSI and from about $4 \times 10^6$ psi to about $1.2 \times 10^7$ psi, respectively. Since vibration damping wire 30 is constrained in length where it is clamped to each of the plurality of standoffs 32, the Nitinol alloy tends to exert a force that resists an increase in the spacing between adjacent standoffs 32. Furthermore, attachment of vibration damping wire 30 at points displaced from a neutral axis of bar 12 (where the neutral axis is defined as a line running through the longitudinal center of bar 12) provides a moment arm for the force exerted by vibration damping wire 30. The effective length of the moment arm in vibration damped structure 10 is the distance between a plane that extends through the neutral axis, parallel to the sides of bar 12, and any point where vibration damping wire 30 is attached to standoffs 32. The force developed by the damping wires acts through the moment arm to oppose deflection of bar 12 in a direction transverse to the neutral axis, toward the side of the bar on which sense wire 42 is attached. This force thus tends to quickly damp each vibrational cycle, bringing the bar to rest.

Clearly, to effectively damp vibration, the force provided by vibration damping wire 30 must be synchronized to oppose the vibratory motion of bar 12 as it deflects back and forth about its rest position, or to restore the bar to the rest position, but should not reinforce it. There is a short time lag between the application of the electrical current pulse to heat the vibration damping wires and the increase in their temperature above the transition temperature; however, this lag time is taken into consideration in determining when to apply each current pulse to the wire, so as to synchronize the force developed by the wires with the vibratory motion of bar 12, in opposition to the deflection of the bar. Both digital and analog circuits for synchronizing the restoring force provided by vibration damping wire 30 with the vibrational motion of a vibrating structure, such as bar 12, are explained in detail below.

The signal output from accelerometer 26 through cable 28 is indicative of the vibratory motion of the distal end of bar 12, and could be used for the purpose of controlling the application of the electrical current pulse to vibration damping wire 30 in either the passive or active damping modes; however, that signal was not used for this purpose in the vibration damping test described above. Instead, sense wire 42 provided the signal used to control the electrical current pulse, utilizing another unusual characteristic of Nitinol alloy to sense the vibrational motion of bar 12. In its Martensite phase, the electrical resistance of Nitinol alloy varies with applied stress. Accordingly, each portion 42a-42i of sense wire 42 changes resistance as it is alternately stretched and relaxed between standoffs 32, as bar 12 deflects from side to side while vibrating, and the periodically varying voltage drop across the entire length (or across portions 42a-42i between adjacent standoffs 32) of sense wire 42 is therefore indicative of the vibratory displacement of bar 12.

The voltage drop signal across the entire length of sense wire 42, i.e., between a proximal end adjacent L-shaped bracket 14 and an opposite distal end, is comparable to the signal produced by accelerometer 26. In fact, when viewed on an oscilloscope, the signal produced by sense wire 42 appears to include less noise than the signal produced by accelerometer 26; thus, sense wire 42 is a preferred vibration sensor. Accelerometer 26 can only sense the acceleration of bar 12 with respect to the point where the accelerometer is affixed to bar 12; however, because sense wire 42 extends substantially the entire length of bar 12, each of the portions 42a-42i between adjacent standoffs 32 separately responds to stress, and thus, comprises a separate vibration sensor.

Wire harness 40 is connected to sense wire 42 at each standoff 32 to effect measurement of the vibrational motion of bar 12 at a plurality of segments along its length. Accelerometer 26 only responds to the acceleration at the distal end of bar 12, and therefore, is limited to sensing only the fundamental resonant frequency of bar 12. In contrast, sense wire 42 can detect the fundamental resonant frequency and harmonics of the fundamental by responding to the stress applied between adjacent standoffs 32 along the length of bar 12. The signals produced by any portion 42a-42i of the sense wire can be used to control the application of an electrical current pulse to any corresponding portion 30a-30i of the vibration damping wire to damp vibrational deflections of bar 12 at multi-modal resonant frequencies. Each portion of sense wire 42 can control the application of an electrical current pulse to a corresponding portion of the vibration damping wires, and separately effect passive or active vibration damping of each segment of bar 12 between standoffs 32.

It should be apparent that many different configurations of sense wire(s) and vibration damping wire(s) may be attached to a structure to control its vibration. As mentioned previously, FIGS. 1 and 2 show an alternate embodiment wherein a second vibration damping wire 30 is provided and connected to cable 28 by leads 40 for application of electrical current pulses in either the active or passive damping mode; however, other variations are possible. For example, sense wire 42 could be attached to standoffs 32 that are spaced longitudinally along the centerline of one side of bar 12, and vibration damping wires 30 attached to standoffs 32 disposed adjacent the edges along both sides of bar 12. Electrical current pulses in synchronization with the vibration signal provided by sense wire 42 could then be applied to vibration damping wires 30 on both sides of the bar to provide even more effective active damping of vibration than the configuration actually tested. Of course, the electrical pulses applied to the wires on one side of the bar would be shifted in phase 180° relative to the pulses applied to the wires on the opposite side of the bar.

Although operation of the present invention was demonstrated using an externally applied vibration damping wire 30 and sense wire 42 as shown in FIGS. 1 and 2, shape memory metal can also be internally mounted within a structure for both passive and active vibration damping, and for sensing displacement of a structure due to vibration. Turning now to FIGS. 3 and 4, another embodiment of the invention is shown wherein a tubular vibration damped structure, generally denoted at reference numeral 50 includes a cylinder 52. Cylinder 52 comprises a fiber resin matrix composite material laid up to integrally include a plurality of vibration damping wires 56 spaced apart internally around and within the wall of the cylinder, and a plurality of sense wires 60, each disposed between adjacent pairs of vibration damping wires 56. Sense wires 60 and vibration damping wires 56, which preferably comprise a Nitinol alloy, are integrally incorporated within the fiber resin matrix composite material as it is laid up to form cylinder 52. At spaced apart points along the longitudinal length of each of the vibration damping wires 56 and sense wires 60 are disposed electrical contacts/restraints 58. Electrical contacts/restraints 58 are crimped or welded onto vibration damping wires 56 and sense wires 60 to form a mechanical and electrical connection, and are fixed in place within the fiber resin matrix composite of cylinder 52.

One or more sense wires 60 are stressed when stretched by the deflection of cylinder 52 away from its longitudinal central (neutral) axis due to vibration. Vibration damping wires 56 (and sense wires 60) provide passive elastic damping of cylinder 52 as a result of the relatively high SDC of the Nitinol alloy compared to that of the structure. When vibration damping wires 56 are heated above the transition temperature at which they change from the Martensite phase to the Austenite phase, in response to signals produced by sense wires 60, they exert a restoring force to oppose and damp the vibrational motion of cylinder 52. The electrical resistance or voltage drop of sense wires 60 are monitored at each of electrical contacts/restraints 58, which are connected through a wire harness (not shown) to a damping system control. The damping system control supplies electrical current pulses that are applied to selected segments of vibration damping wires 56, and is disposed, for example, within a base 54 that supports tubular vibration damped structure 50. Electrical contacts/restraints 58, which are disposed along the length of each of vibration damping wires 56 provide means for applying the electrical current pulses to selected segments of vibration damping wires 56, in order to heat the Nitinol alloy above its transition temperature, in response to vibration signals produced by corresponding segments of sense wires 60 disposed diametrically opposite the selected segments.

In FIG. 5, an alternative embodiment for electrical contacts/restraints 64 is shown generally at reference numeral 62. This embodiment may be used with either vibration damping wire 56 or sense wire 60. Electrical contacts/restraints 64 are crimped in place or spot welded on either the vibration damping wire or sense wire at spaced apart intervals as shown in FIG. 5, and are integrally embedded in place when the fiber resin matrix composite material comprising a structure such as cylinder 52 is laid-up. An electrical wire harness including leads (not shown) soldered or spot welded to each of electrical contacts/restraints 64 may be integrally incorporated within the structure, or the leads may extend out of the structure at each point of connection to one of electrical contacts/restraints 64.

In FIG. 6, part of a cylinder 72 is shown in a tubular vibration damped structure 70. A plurality of sensor wires 78 are disposed adjacent each of a plurality of vibration damping strips 74, within the wall of cylinder 72. Vibration damping strips 74 are formed from a sheet of the Nitinol alloy, have passive vibration damping characteristics similar to vibration damping wires 56, and may be selectively energized in an active damping mode when heated above the transition temperature of the Nitinol alloy. Vibration damping strips 74 are restrained in place within the fiber resin matrix composite material comprising cylinder 72 by a plurality of restraint burrs or tips 76 formed by partially punching through vibration damping strips 74 to displace a portion of the Nitinol alloy outwardly of the planar surface of the strips. The fiber resin matrix composite material binds against restraint tips 76, locking vibration damping strips 74 in place within the structure. Electrical contact with vibration damping strips 74 may be made at predefined intervals along their longitudinal length by tack welding electrical leads (not shown) to the strips, or by other mechanical attachment of the leads.

A vibration sensor (not shown) can also be made of thin Nitinol alloy foil, in a form similar to vibration damping strips 74, and fixed in place by embedment in the fiber resin composite material, using restraint tips 76. Variation in the voltage drop across a portion of the thin Nitinol alloy foil due to stress caused by vibration would provide a signal indicative of the vibration of the structure, as explained above.

Vibration damped structure 10 and tubular vibration damped structures 50 and 70 are each relatively simple structures. However, the present invention is also applicable to damp vibration in a more complex structure, as exemplified by a vibration damped strut assembly 80, illustrated in FIGS. 7, 8, and 9. Vibration damped strut assembly 80 includes three strut tubes 82, extending longitudinally between opposed end plates 86, each end plate generally having the shape of an equilateral triangle. Strut tubes 82 are mounted to end plates 86 on stubs 90, which are disposed adjacent the three corners of the end plates. A plurality of cross braces 84 are connected between adjacent strut tubes 82, extending at an angle between a plurality of bond connectors 88 that are attached to strut tubes 82 at regular spaced apart intervals along the longitudinal length of each of the strut tubes. In FIG. 7, only the cross braces 84 between the two strut tubes 82 shown in the foreground are illustrated; however, it will be understood that additional cross braces 84 are also provided between each of the two strut tubes 82 shown in the foreground and the strut tube 82 that is disposed at the rear of vibration damped strut assembly 80.

As shown in FIG. 8, strut tubes 82 each have a sense wire 98 and a vibration damping wire 100 embedded in their walls, running longitudinally along their length. Strut tubes 82 include electrical leads (not shown) for carrying signals from sense wires 98 and for carrying electrical current to heat vibration damping wires 100 above the transition temperature of the Nitinol alloy of which they are comprised, to effect active damping of the strut assembly. Vibration damping wires 100 also provide passive vibration damping of strut tubes 82 due to their relatively high SDC, compared to that of the fiber resin composite material comprising strut tubes 82.

With reference to FIG. 9, end plates 86 include a control module 92 and three sense modules 94, potted in place with epoxy or other suitable material. The electronic components comprising control module 92 and sense modules 94 are connected to sense wires 98 and vibration damping wires 100 by plurality of electrical leads 96. Control module 92 monitors the signals produced by sense wires 98, which are indicative of the displacement of one or more strut tubes due to vibrational stress of the sense wire(s), and in response to the signals, produces electrical current pulses that are input to one or more selected vibration damping wires 100. The electrical current pulses heat the selected vibration damping wires above the transition temperature. As the current pulses cause the Nitinol alloy comprising selected vibration damping wires 100 to change to the Austenite phase, the wires contract to a shorter memory shape, applying a force that opposes the vibrational displacement of strut assembly 80. Each sense wire 98 and each vibration damping wire 100 may be divided into corresponding segments along the length of strut tubes 80, to separately control displacement of each segment, but a separate sense module and control module must be provided for each such segment.

Figure 10:
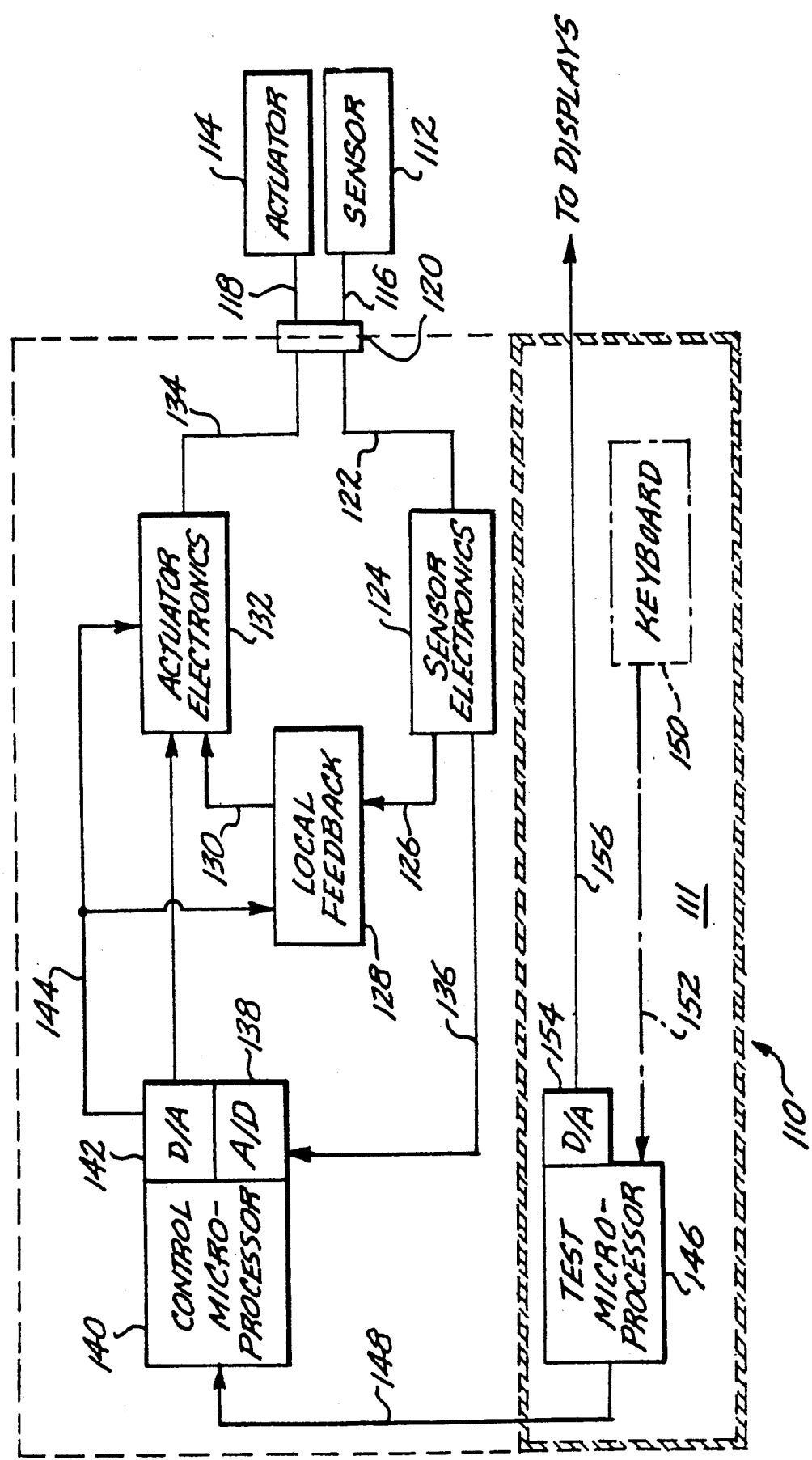
FIG. 10 is a block diagram illustrating a vibration damping control system.

FIG. 10 illustrates a block diagram of a digital control for sensing the vibration of a structure and producing an electrical current pulse that is applied to heat a Nitinol alloy actuator to dampen the vibration. The digital control is generally represented at reference numeral 110, and includes a portion 111 (delineated with cross-hatched lines) that enables operator interaction, i.e., input of parameters and data output. The cross-hatched line portion 111 may be omitted if user interface to digital control 110 is not required.

Digital control 110 is connected to a vibration sensor 112, which produces a signal indicative of the vibrational displacement of a structure, such as vibration damped structure 10; the vibration sensor may comprise a Nitinol alloy sense wire, or foil, attached externally or internally to the structure, as described for the preceding embodiments. The signal produced by vibration sensor 112 is input to digital control 110 over leads 116, which terminate at a connector 120. Similarly, a vibration damper actuator 114, preferably comprising Nitinol alloy in the form of wire, thin strips, rods, bars or other appropriate shape is attached to the structure at least at two spaced apart points; it is activated by an electrical current pulse provided over leads 118, which terminate at connector 120.

Connector 120 is attached through leads 122 to a sensor electronics block 124. Sensor electronics block 124 provides a source of direct current, which is applied to vibration sensor 112, so that the voltage drop across the vibration sensor may be determined in monitoring the stress caused by the vibrational displacement of the structure. Alternatively, sensor electronics block 124 may comprise a monitor circuit appropriate for any other vibration sensor used, e.g., accelerometer, strain gauge, or LVDT. The signal output from sensor electronics block 124, which is indicative of the vibrational displacement monitored by vibration sensor 112, is carried over a lead 126 to a local feedback block 128.

Local feedback block 128 produces a control signal that is output over a lead 130 to an actuator electronics block 132 when the signal from sensor electronics block 124 exceeds a predetermined level. For example, the signal provided from sensor electronics block 124 may represent a periodic sine wave at a frequency equal to the fundamental resonant frequency of the vibrating structure, and the control signal from local feedback block 128 may comprise a trigger pulse initiated as a function of the instantaneous phase amplitude of the vibrational displacement sine wave signal produced by vibration sensor 112.

Figure 12:
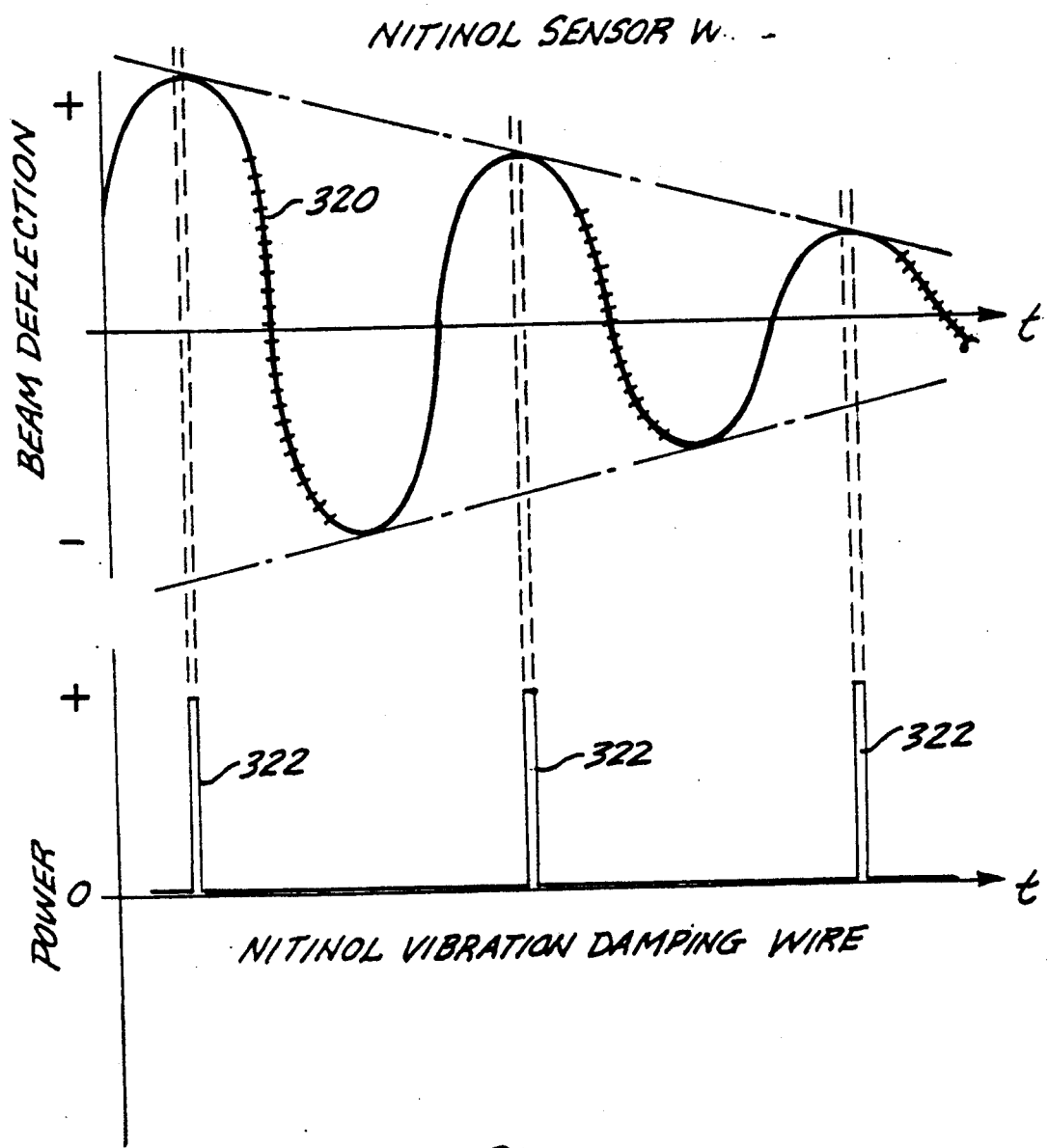
FIG. 12 is a graph illustrating the phase relationship between deflection of a vibrating structure and a current pulse applied to a vibration damping wire.

The phase relationship between the electrical current pulse that is applied to heat vibration damper actuator 114 and the vibrational displacement of the structure monitored by vibration sensor 112 is graphically illustrated for one preferred case in FIG. 12. A curve 320 represents the vibrational displacement of a vibrating beam (e.g., bar 12), as it deflects from side-to-side. The vibration cyclically stresses the Nitinol alloy comprising vibration sensor 112, changing its resistance and the voltage drop across it, as shown by curve 320. The current pulses applied to vibration damper actuator 114 are illustrated graphically by square waves 322. In this example, the current pulses are applied just before vibrational displacement curve 320 reaches a peak positive value, so that the force applied by the vibration damper actuator opposes the motion of the beam only during the negative slope of curve 320, i.e., as the beam deflects through its centered rest position toward the opposite side, as shown by the cross-hatched portion of the curve. When the Nitinol alloy cools and reverts back to the Martensite phase, the force exerted by the vibration damping actuator decreases and is minimal as the beam deflects back through its rest position along the positive slope of vibrational displacement curve 320.

The control signal input to actuator electronics block 132 over lead 130 triggers each electrical current pulse, which is output over a lead 134. Current pulses on lead 134 are conveyed by leads 118 to vibration damper actuator 114 through connector 120.

The signal produced by sensor electronics block 124 is also output over a lead 136 and thus supplied to an analog-to-digital converter 138. Analog-to-digital converter 138 digitizes the analog signal from sensor electronics block 124 for input to a control microprocessor 140. Control microprocessor 140 is programmed to control the duration and amplitude of the current pulse supplied to vibration damper actuator 114 by actuator electronics block 132 as a function of the vibrational displacement signal produced by vibration sensor 112. To adjust these parameters, control microprocessor 140 produces a digital signal that is input to a digital-to-analog converter 142, causing it to produce a corresponding analog signal over a lead 144 that is connected to both local feedback block 128 and to actuator electronics block 132. The analog signal produced by control microprocessor 140 controls the phase timing of the control signal produced by local feedback block 128, and the amplitude of the current pulse produced by actuator electronics block 132 in response to the control signal. Actuator electronics block 132 may comprise a comparator and a switching transistor or other suitable components, as will be apparent to those of ordinary skill in the art.

As shown within the cross-hatched line portion 111 of FIG. 10, digital control 110 includes a test microprocessor 146, which is connected to control microprocessor 140 through leads 148. Test microprocessor 146 permits an operator to modify the control algorithm implemented by control microprocessor 140 in order to vary the control parameters including the timing, duration, and amplitude of the electrical current pulse applied to vibration damper actuator 114 by actuator electronics block 132. The test microprocessor is controlled by signals input from a keyboard 150 through a cable 152. In addition, test microprocessor 146 includes a digital-to-analog converter 154 that produces an analog signal corresponding to its digital input; the analog signal is output through a lead 156 to drive an oscilloscope display (not shown). It will be apparent that keyboard 150 and test microprocessor 146 are not required once optimum control parameters have been determined for a specific application of digital control 110.

Figure 11:
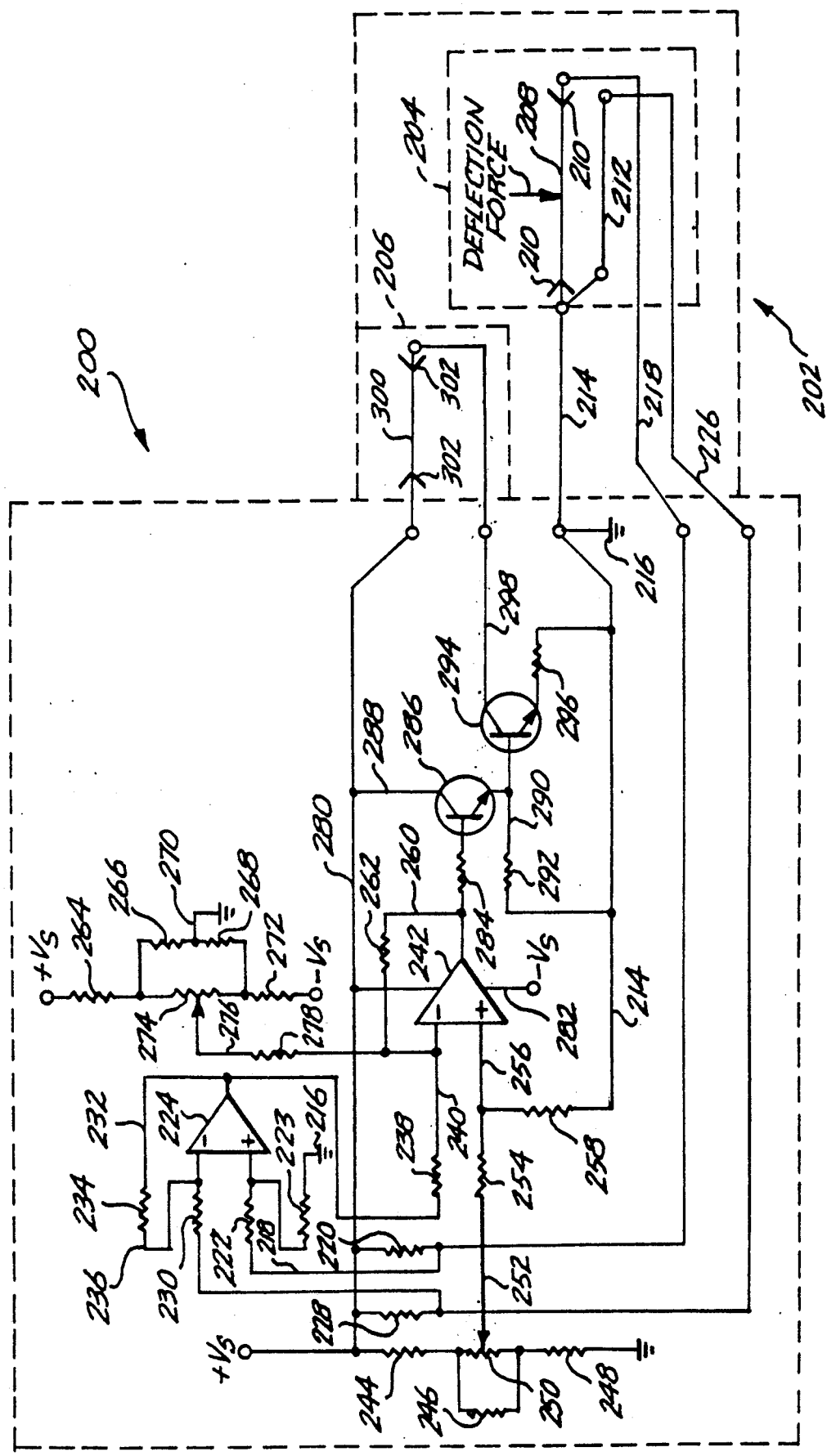
FIG. 11 is an electrical schematic diagram illustrating an analog vibration damping control.

Referring now to FIG. 11, an analog control used to control the vibration of a structure 202 is generally represented at 200. Structure 202 includes a vibration sensor 204 and a vibration damping actuator 206. As in the preferred embodiments described above, vibration sensor 204 preferably includes a sensor wire 208 of Nitinol alloy, which changes resistance when subjected to stress resulting from the vibrational displacement of structure 202. Sensor wire 208 is mounted between two constraints 210 within structure 202 so that it is sensitive to a periodic displacement of structure 202 that creates stress by stretching it between constraints 210 as the structure vibrates back and forth. Although not necessary in many applications, if structure 202 is exposed to wide temperature variation, the relative change in resistance of sensor wire 208 is more accurately determined with respect to a reference wire 212, that is made of the same material, but is not subject to stress as structure 202 vibrates back and forth.

One end of reference wire 212 and of sensor wire 208 are connected in common to a lead 214, and through that lead, to a ground connection 216. The other end of sensor wire 208 is connected through a lead 218 to a resistor 220, which is disposed within analog vibration damping control 200. Resistor 220 limits the electrical current that flows through sensor wire 208 from a $+V_S$ DC power supply (not shown) through a lead 280. The voltage drop across sensor wire 208, which varies as the stress applied to the sensor wire changes, is conveyed through lead 218 to a resistor 222, and thus to the noninverting input of an operational amplifier (Op Amp) 224. Similarly, the end of reference wire 212, which is not common to sensor wire 208, is connected through a lead 226 to a resistor 228. Resistor 228 also is connected to the $+V_S$ DC power supply through lead 280, and its purpose is to limit the current flowing through reference wire 212. The voltage drop across reference wire 212 is conveyed through lead 226 to a resistor 230, which is connected to the inverting input of Op Amp 224.

Op Amp 224 amplifies the difference between the voltage drops across reference wire 212 and sensor wire 208, producing an output signal that is fed back through a lead 232, a feedback resistor 234, and a lead 236, to the inverting input of Op Amp 224. Lead 232 thus carries a signal representing the amplified differential voltage drop between reference wire 212 and sensor wire 208, which is a function of the stress applied to sensor wire 208 and is substantially independent of ambient temperature effects.

Lead 232 is connected to a resistor 238, the other side of which is connected through a lead 240 to the inverting input of a comparator 242. The noninverting input of comparator 242 is referenced to a predetermined DC voltage provided by a voltage divider comprising a resistor 244, connected in series with resistors 246 and 248, between the $+V_S$ power supply and ground. A variable resistor 250 is connected in parallel with resistor 246 to provide adjustment of the reference voltage that is provided to the noninverting input of comparator 242 through a lead 252, an input resistor 254 and a lead 256. The noninverting input of comparator 242 is referenced to ground through a resistor 258 and lead 214. The output of comparator 242 is fed back through a lead 260 and a resistor 262 to the inverting input of the comparator.

A bias voltage is developed by an adjustable voltage divider comprising a resistor 264, connected in series with resistors 266, 268, and 272. One end of resistor 264 is connected to the $+V_S$ power supply, and one end of resistor 272 is connected to the $-V_S$ power supply voltage. The junction of resistors 266 and 268 is connected through a lead 270 to ground, while a variable resistor 274, connected in parallel to the series connected resistors 266 and 268, permits adjustment of the bias voltage. The bias voltage output from the wiper of variable resistor 274 is conveyed through a lead 276, a resistor 278, and lead 240 to the inverting input of comparator 242, where it is summed with the output of Op Amp 224.

Comparator 242 has a positive output when the differential voltage between sensor wire 208 and reference wire 212, summed with the bias voltage provided through resistor 278, is greater in absolute magnitude than the reference voltage applied through input resistor 254. The voltage output from comparator 242 is supplied through a current limiting resistor 284 to the base of an NPN transistor 286. The collector of NPN transistor 286 is connected through a lead 288 to the $+V_S$ power supply, while the emitter of the NPN transistor is connected through a lead 290 to a base connection of another NPN transistor 294. Transistors 286 and 294 together comprise an emitter-follower pair. Lead 290 is connected to ground through a resistor 292 and lead 214; the emitter of NPN transistor 294 is connected to ground through a resistor 296 and lead 214. The collector of NPN transistor 294 is connected through a lead 298 to one side of a Nitinol alloy vibration damping wire 300, comprising vibration damping actuator 206. Vibration damping wire 300 is mounted between two constraints 302 within structure 202, so that its relatively high SDC (compared to the SDC of structure 202) passively damps vibrations of the structure. When vibration damping wire 300 is heated above the transition temperature of the Nitinol alloy, the alloy changes to its Austenite phase in which it has a shortened memory shape, thereby exerting a force that acts upon structure 202 through constraints 302, to oppose its vibration.

Current pulses are applied to one end of vibration damping wire 300 through lead 280, its other end being connected to ground through the emitter-collector junction of NPN transistor 294 when the output of comparator 242 is more positive in potential than lead 290. The positive potential applied to the base of NPN transistor 286 causes it to conduct current from the $+V_S$ power supply through lead 288 to ground through its emitter and through resistor 292. The voltage developed across resistor 292 as current flows to ground through the emitter-collector of NPN transistor 286 produces a bias voltage at the base of NPN transistor 294, turning it on so that it freely conveys current through vibration damping wire 300.

Variable resistors 250 and 274 are adjusted to control the timing and duration of the current pulse applied to vibration damping wire 300 with respect to the vibrational motion of structure 202. These variable resistors are adjusted to control the application of the current pulse so that vibration damping wire 300 changes to the Austenite memory shape phase and contracts at a proper time to provide a force that opposes the vibration of structure 202, damping the vibration much more quickly than would occur if the vibrations were allowed to damp out naturally, and even much more quickly than would result from the passive damping provided by vibration damping wire 300.

Analog vibration damping control 200 represents a first generation preferred embodiment for such a device; it is likely that the control would be substantially simplified and reduced in size in a commercial embodiment. One analog vibration damping control 200 or digital control 110 is required for each discrete sensor wire 208 and vibration damping wire 300 used in a structure. It is therefore contemplated that a relatively simple vibration damping control on a chip (either analog, digital, or a combination thereof) would be developed to control active damping of vibration in complex structures such as vibration damped strut assembly 80, shown in FIG. 7, or for control of vibration along a plurality of segments extending longitudinally along the length of a vibrating structure, such as cylinder 52, shown in FIG. 3.

In each of the preceding preferred embodiments, active vibration damping is accomplished by heating Nitinol alloy above the temperature at which it regains its memory shape. Other materials, including alloys of copper and zinc, exhibit the temperature dependent shape memory characteristic and could be used as an active vibration damper instead of Nitinol, although the latter is preferred because of its high phase change force, fast phase change reaction time, high yield stress, greater specific damping capacity, and excellent corrosion resistance. The melting temperature of Nitinol (1300° C.) is sufficiently high that it can readily survive cure temperatures of fiber resin matrix compositions in which it is incorporated. The transition temperature of the Nitinol alloy used for active vibration damping can be controlled over a limited range by varying its composition. Optimum reaction time for the conversion of the Nitinol alloy from its Martensite to Austenite phase can be achieved by selecting an alloy having a transition temperature only a few degrees Celsius higher than the highest ambient temperature to which the vibration damped structure may be exposed, so that the electrical current pulse need only slightly increase the internal temperature of the alloy to effect the phase change and to permit rapid cool-down of the alloy, facilitating its change back to the Martensite phase.

Torsional vibration of a structure can also be both passively and actively damped using shape memory materials such as the Nitinol alloy. For example, with respect to FIG. 3, affixing vibration damping wires 56 and sensor wires 60 in a helical pattern about cylinder 52 (rather than longitudinally) would provide a torsionally vibration damped tubular structure.

While several preferred embodiments of the present invention have been shown, it will be apparent that further modifications to the invention may be made by a person of ordinary skill in the art within the scope of the claims that follow below. Accordingly, it is not intended that the scope of the invention be in any way limited by the disclosure of the preferred embodiments, but instead that it be determined entirely by reference to the claims.

The embodiments of the invention in which an exclusive property or privilege is claimed are defined as follows:

1. A mechanism for damping vibration of a structure, comprising:
   a member comprising a metal alloy having temperature responsive shape memory characteristics and characterized by a very high specific damping capacity compared to the specific damping capacity of the structure; and
   means for attaching the member to the structure at least at two spaced apart points that are offset from a neutral axis of the structure, said points being selected so that the spacing between the points cyclically varies as the structure vibrates, the variation in spacing between the points applying stress to the member, said member absorbing energy from the structure as it is stressed, and thereby damping the vibration of the structure.

2. The mechanism for damping vibration of claim 1, wherein the member is externally attached to the outer surface of the structure.

3. The mechanism for damping vibration of claim 1, wherein the member is integral to the structure and disposed within it.

4. The mechanism for damping vibration of claim 3, wherein the structure comprises a composite material in which the member is embedded.

5. The mechanism for damping vibration of claim 4, wherein the means for attaching comprise a plurality of stabilizers connected to the member and spaced apart along its longitudinal axis, said stabilizers having a different cross-sectional size than the member and are fixedly held in place by their embedment within the composite material.

6. The mechanism for damping vibration of claim 1, wherein the member dampens vibration as the structure is displaced in a direction generally transverse to the neutral axis.

7. The mechanism for damping vibration of claim 1, wherein the member damps torsional vibration about the neutral axis.

8. The mechanism for damping vibration of claim 1, wherein the member is elongate and extends generally parallel to a longitudinal axis of the structure.

9. The mechanism for damping vibration of claim 1, further comprising means for heating the member above a transition temperature at which it resumes a foreshortened memory shape.

10. The mechanism for damping vibration of claim 9, further comprising control means connected to the means for heating, for enabling heating of the member in response to the vibration of the structure, said member applying force actively damping the vibration of the structure when heated above the transition temperature.

11. The mechanism for damping vibration of claim 10, further comprising means for sensing vibration of the structure and producing a signal indicative of said vibration, wherein the control means are connected to receive said signal and are operable to enable the means for heating in synchronization with the vibration of the structure.

12. The mechanism for damping vibration of claim 11, wherein the means for sensing comprise a metal alloy having temperature responsive shape memory characteristics and characterized by a change in electrical resistance as a function of stress applied to the metal alloy, and wherein the means for sensing are attached to the structure at least at two spaced apart points and are stressed as the structure vibrates, said signal comprising a measure of the electrical resistance of said metal alloy changing in response to the stress.

13. Apparatus for damping vibration of a structure, comprising:
   (a) means for sensing the vibration of the structure and for producing a signal indicative of the vibration;
   (b) shape memory means for opposing a displacement of the structure caused by the vibration, said shape memory means being characterized by a decrease in length when heated above a transition temperature;
   (c) means for attaching the shape memory means to the structure at least at two spaced apart points so that the shape memory means are offset from a neutral axis of the structure and are subjected to stress due to said displacement of the structure; and
   (d) means for heating the shape memory means above the transition temperature in response to the signal indicative of vibration so that the change in length of the shape memory means is synchronized with the vibration of the structure.

14. The apparatus of claim 13, wherein the means for heating are operative to rapidly heat the shape memory means above the transition temperature, causing the shape memory means to resume a foreshortened shape memory length and thereby applying a force in opposition to the stress caused by the displacement of the structure, said shape memory means having a substantially higher modulus of elasticity when heated above the transition temperature.

15. The apparatus of claim 13, wherein the means for heating comprise a source of electrical current that is connected to provide a pulse of electrical current through the shape memory means.

16. The apparatus of claim 13, wherein the means for attaching comprise embedment of the shape memory means in the structure.

17. The apparatus of claim 13, wherein the means for attaching comprise a plurality of standoffs connected to an outer surface of the structure.

18. The apparatus of claim 13, wherein the shape memory means are attached to the outer surface of the structure, are elongate, and extend generally longitudinally along the structure.

19. The apparatus of claim 13, wherein the shape memory means comprise a thin sheet.

20. The apparatus of claim 13, wherein the shape memory means are characterized by a very high specific damping capacity, compared to the specific damping capacity of the structure, and therefore absorb energy from the structure when plastically deformed due to vibration of the structure, and wherein the specific damping capacity of the shape memory means is greater below the transition temperature than above the transition temperature.

21. The apparatus of claim 13, wherein the shape memory means comprise one or more selected from the group consisting of alloys of copper, zinc, and aluminum, and alloys of nickel and titanium.

22. The apparatus of claim 13, wherein the means for sensing vibration comprise a shape memory metal alloy characterized by an electrical resistance that varies in proportion to the stress to which the metal alloy is subjected.

23. The apparatus of claim 22, wherein the means for sensing vibration are attached to the structure at least at two spaced apart points, and are offset from the neutral axis of the structural so that as the structure vibrates, the shape memory metal alloy is subjected to a varying stress that changes its resistance in proportion to the vibrational deflection of the structure.

24. The apparatus of claim 23, wherein the means for sensing vibration further comprises means for measuring a voltage drop across the shape memory metal alloy to determine its resistance, said signal indicative of vibration thus comprising the voltage drop.

25. The apparatus of claim 14, wherein the force produced by the shape memory means is generally aligned with the neutral axis.

26. The apparatus of claim 13, wherein the structure is generally cylindrical, and the shape memory means comprise a plurality of elongate elements extending generally along the length of the structure and circumferentially spaced apart around a longitudinal axis of the structure.

27. The apparatus of claim 13, wherein the structure is relatively thinner in one dimension than in other dimensions transverse thereto, said shape memory means opposing vibrational deflections of the structure in a direction generally aligned with said one dimension.

28. The apparatus of claim 13, wherein the shape memory means oppose torsional vibrations of the structure.

29. A method for damping vibration of a structure, comprising the steps of:
providing a member comprising a metal alloy having temperature responsive shape memory characteristics, said member being characterized by a very high specific damping capacity relative to the specific damping capacity of the structure;
attaching the member to the structure at least at two spaced apart points that are offset from a neutral axis of the structure, said points being selected so that the spacing between the points cyclically varies as the structure vibrates; and
absorbing energy from the structure when stress is applied to said member between said points as the structure vibrates, thereby damping the vibration of the structure.

30. The method of claim 29, wherein the member is externally attached to the outer surface of the structure.

31. The method of claim 29, wherein the member is integral to the structure and disposed within it.

32. The method of claim 31, wherein the structure comprises a composite material in which the member is embedded.

33. The method of claim 29, further comprising the step of heating the member above a transition temperature at which it resumes a foreshortened memory shape.

34. The method of claim 33, further comprising the step of enabling heating of the member in response to the vibration of the structure, said member applying force opposing the vibration of the structure when heated above the transition temperature.

35. The method of claim 34, further comprising the step of sensing vibration of the structure and producing a signal indicative of the vibration, and wherein the step of enabling heating is carried out in response to the signal so that the member is heated above the transition temperature in synchronization with the vibration of the structure, causing the member to resume its foreshortened memory shape when the member is not stressed due to vibration.

36. A vibration sensor comprising:
a member comprising a metal alloy having temperature responsive shape memory characteristics and characterized by an electrical resistance that varies as a function of stress to which the member is subjected when connected to a vibrating structure at a plurality of points that are offset from a neutral axis of the structure; and
means for monitoring the electrical resistance of the member and producing a signal corresponding thereto, said signal being indicative of a vibration induced stress of the member.

37. The vibration sensor of claim 36, wherein the means for monitoring resistance comprise a resistance sensor.

38. The vibration sensor of claim 36, wherein the means for monitoring the electrical resistance comprise a source of electrical current connected to the member so that the electrical current flows through the member, and means for measuring a voltage drop across the member caused by its resistance to the electrical current.

39. The vibration sensor of claim 36, wherein the member comprises an alloy of nickel and titanium.

40. The vibration sensor of claim 36, wherein the member comprises an elongate wire.

41. The vibration sensor of claim 36, wherein the member comprises a thin foil strip.

* * * * *